Jan. 2, 1968

L. J. MALICAY 3,361,172

METHOD OF CLEANING AND SHREDDING COCONUT

Original Filed March 20, 1963

INVENTOR.
LEANDRO J. MALICAY
BY
Victor J. Evans & Co.
Attorneys

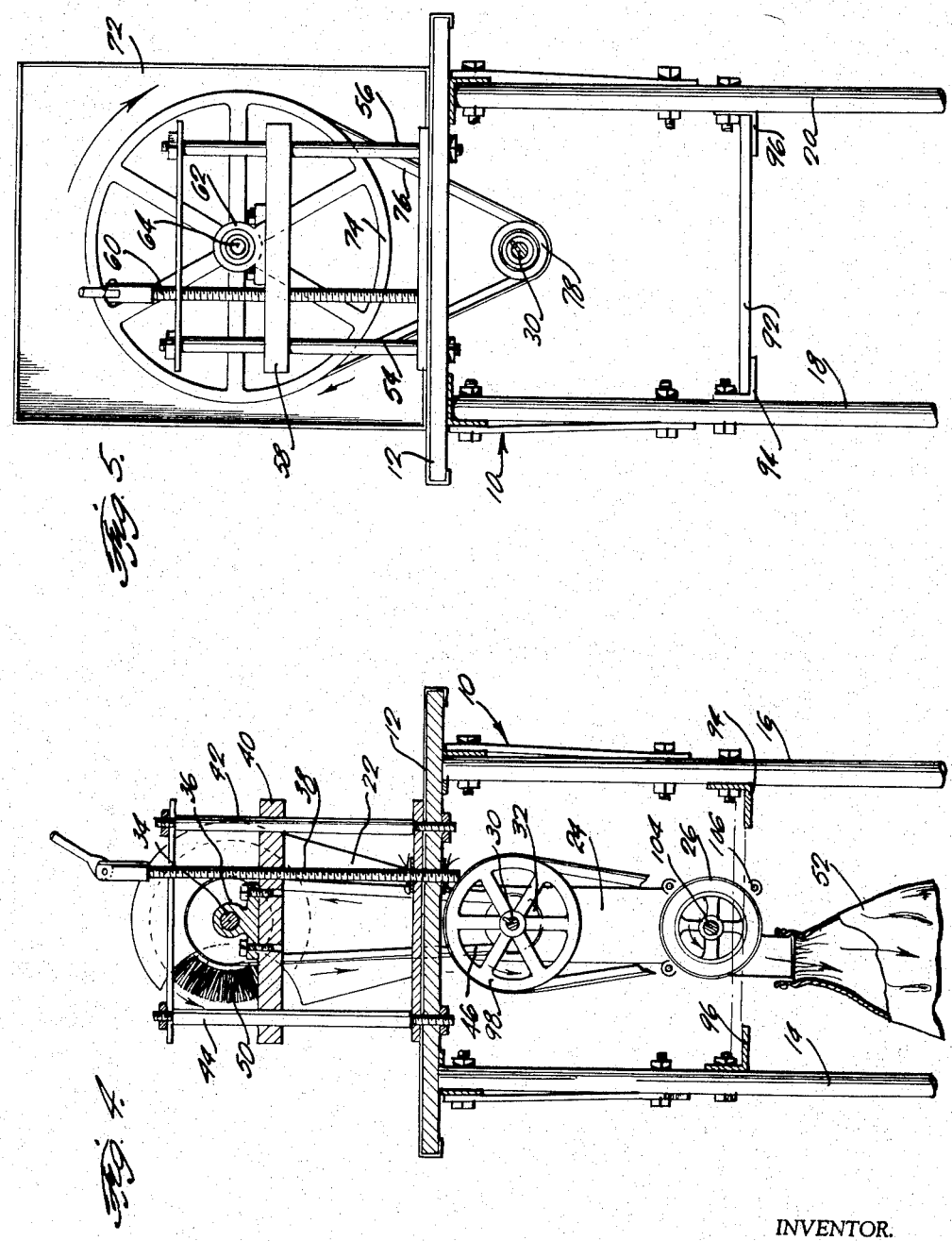

United States Patent Office 3,361,172
Patented Jan. 2, 1968

3,361,172
METHOD OF CLEANING AND SHREDDING COCONUT
Leandro J. Malicay, 1301 W. Olympic Blvd., Los Angeles, Calif. 90015
Original application Mar. 20, 1963, Ser. No. 266,546, now Patent No. 3,212,543, dated Oct. 19, 1965. Divided and this application Feb. 26, 1965, Ser. No. 435,530
1 Claim. (Cl. 146—222)

This application is a divisional application of applicant's copending application Ser. No. 266,546, filed Mar. 20, 1963, for Coconut Shredding Device now Patent No. 3,212,543.

The present invention relates to a method of shredding coconut and preparing the coconut prior to shredding.

An object of the present invention is to provide a method of removing the loose husk from a coconut and for shredding the meat of the coconut.

Another object of the present invention is to provide a method of preparing a coconut for shredding, and utilizing a particular blade for cutting the meat from the coconut shell.

These and other objects and advantages of the present invention will be fully apparent from the following description when taken in connection with the annexed drawings in which:

FIGURE 4 is a view taken on the line 4—4 of FIGURE 1; and

FIGURE 5 is a view taken on the line 5—5 of FIGURE 1.

Figure 1:
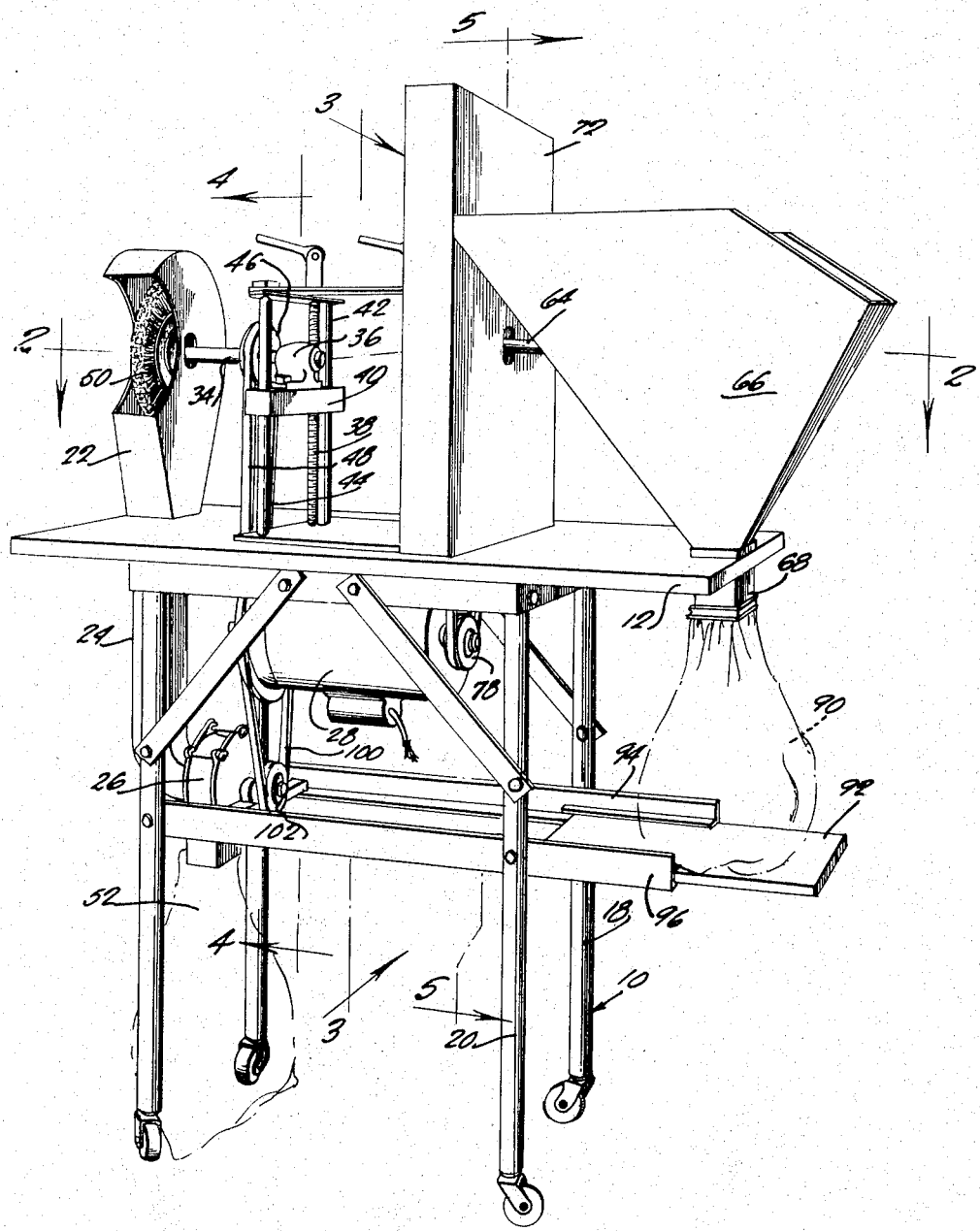
FIGURE 1 is a perspective view of the machine of the present invention.

Referring in greater detail to the drawings, in which like numerals indicate like parts throughout the several views, the apparatus or machine of the present invention comprises a table 10 having a top 12 and legs 14, 16, 18, 20 supporting the table top 12. Rising from the table top 12 adjacent one end is a housing 22 having its lower end connecting in communication with a conduit 24 leading to a blower housing 26.

A source of rotary power or electric motor 28 is mounted below the table top 12 and carries on one end of its shaft 30 a pulley 32. A horizontally disposed shaft 34 is journaled in a bearing block 36 which is connected by a screw member 38 to the table top 12 for upward and downward movement. The block 36 is supported upon a horizontal base element 40 which is slidable on a pair of standards 42 and 44, as shown most clearly in FIGURE 4.

The shaft 34 carries a pulley 46 and an endless belt 48 travels over the pulley 46 and over the pulley 32.

One end of the shaft 34 carries a wire brush 50 which is almost totally enclosed by the housing 22.

A disposal bag 52 has its open top removably secured to the outlet of the blower housing 26.

Another pair of standards 54 and 56 rise from the table top 12 and another base element 58 is slidable thereon. A screw element 60 is threaded in the base element 58 and serves to raise and lower the base element 58 on which there is another bearing block 62 journaling therein a horizontally disposed shaft 64.

A hopper 66 is disposed over the table top 12 and has its lower end provided with a discharge conduit 68. The shaft 64 has a portion adjacent one end projecting into the hopper 66 through an opening 70 provided in the wall of the hopper 66.

The hopper 66 is supported upon a shield element 72 rising from the table top 12 and shielding a large pulley 74 against shredded coconut worked within the hopper 66.

A belt 76 travels over the pulley 74 and over another pulley 78 mounted upon the motor shaft 30 remote from the pulley 32.

Figure 2:
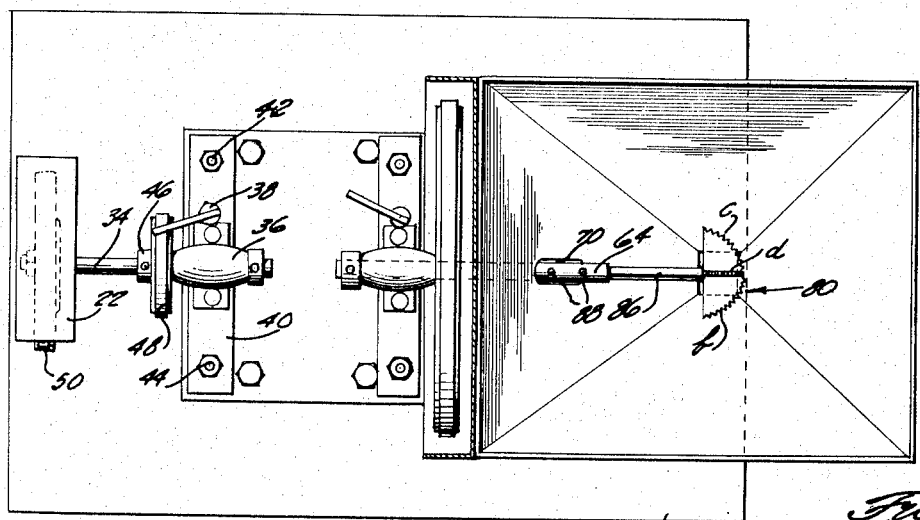
FIGURE 2 is a view taken on the line 2—2 of FIGURE 1.
Figure 3:
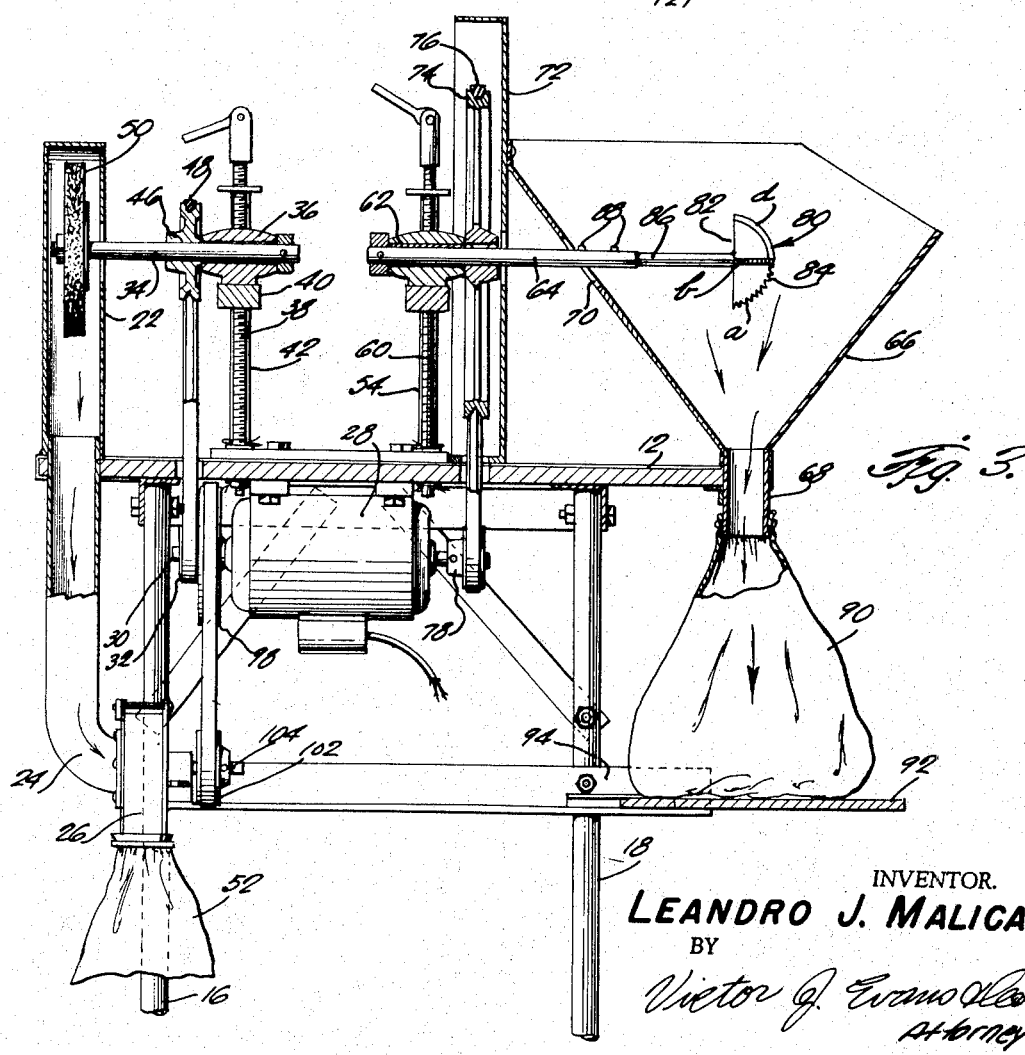
FIGURE 3 is a view taken on the line 3—3 of FIGURE 1.

An important feature of the present invention resides in a hemispherical blade assembly 80 secured to the free end of the shaft 64 with the base 82 of the assembly adjacent the shaft 64 and with the arcuate edges 84 facing outwardly of the shaft 64. Also, the blade assembly 80 has three arcuate toothed sections marked a, b, and c, and one section without teeth or smooth, at d in FIGURES 2 and 3.

Preferably the blade assembly 80 is mounted upon a stub shaft 86 which is inserted in the hollow end of the shaft 64 and secured thereto by means of set screws 88. A bag receptacle 90 having an open top is positioned upon a sliding shelf 92 detachably secured to a pair of channel members 94 and 96 and supported in the legs of the table 10. The receptacle 90 has its open top connected in communication with the conduit 68 at the lower end of the hopper 66.

The motor shaft 30 also carries a pulley 98 having a belt 100 traveling thereover and also traveling over another pulley 102 on the shaft 104 of the blower housing 26.

A brace 108 connects each of the legs 14, 16, 18 and 20 to the table top 12 and serves to steady the machine when in operation.

In use, the wire brush 50 is employed to take the loose outer husk off of the coconut shell so that the husk does not drop into the container or receptacle 90 along with the shredded coconut meat when the shell halves are held over the blade assembly 80 with the blade sections rotating within the shell and cutting the meat therefrom.

The a, b, c, and d sections of the blade assembly 80 are arranged in criciform relation and the purpose of the three notched blades and one smooth blade is that the notched blades scrape the coconut meat from the shell while the smooth blade cuts deeper than the notched blades and removes the scraped and serrate meat while the blade assembly 80 rotates.

When the bag 52 becomes full of the shredded husk removed from the shell, it may be readily removed and the shelf 92 is slidable inward and outward of the table 10 so that the receptacle 90 is easily removed and replaced on the hopper conduit 68 when full.

It will be seen therefore that the unitary machine of the present invention provides a means for quickly and with facility preparing and shredding a coconut and that a single operator employing the machine can quick and efficiently produce shredded coconut in any amount required.

What is claimed is:

1. The method of shredding coconut comprising the steps of cleaning the outer surface of the shell by wire brushing, splitting the coconut into its component halves, shredding the coconut meat from the shell halves by a hemispherical rotating blade assembly in contact therewith, and then collecting the shredded coconut meat and then collecting separately dust-like material from the wire brushing operation at a point remote from the shredding operation.

References Cited

UNITED STATES PATENTS

| | | | |
|---|---|---|---|
| 1,355,393 | 10/1920 | De Ghetto | 146—49 |
| 2,456,446 | 12/1948 | Rieske | 146—7 |
| 2,747,632 | 5/1956 | Barton | 146—8 |

FOREIGN PATENTS

| | | |
|---|---|---|
| 192,291 | 2/1923 | Great Britain. |
| 18,188 | 6/1935 | Australia. |

W. GRAYDON ABERCROMBIE, *Primary Examiner.*